United States Patent [19]

Starp

[11] 4,062,030
[45] Dec. 6, 1977

[54] INTERCHANGEABLE LENS RETAINING MEANS FOR PHOTOGRAPHIC CAMERAS

[75] Inventor: Franz Starp, Wildbad, Germany

[73] Assignee: Carl Zeiss Stiftung, Oberkochen, Germany

[21] Appl. No.: 742,855

[22] Filed: Nov. 18, 1976

[30] Foreign Application Priority Data

Nov. 29, 1975 Germany .............................. 2553861

[51] Int. Cl.² ........................................... G03B 17/14
[52] U.S. Cl. .................................... 354/286; 350/257
[58] Field of Search ............... 354/202, 286; 350/257, 350/252

[56] References Cited

U.S. PATENT DOCUMENTS

| 2,756,633 | 7/1956 | Brondes et al. | 350/257 X |
| 3,893,221 | 7/1975 | Lehmann | 354/286 X |

Primary Examiner—Edna M. O'Connor

Attorney, Agent, or Firm—Stonebraker, Shepard & Stephens

[57] ABSTRACT

Interchangeable lens retaining means for photographic cameras, so designed that the interchangeable lens may be placed on or removed from the camera by a simple axial movement in the direction of the optical axis, without requiring the rotational or twisting movement required when a conventional bayonet type mount is used. Shoulders on the interchangeable lens are engaged by a plurality of pivoted latches on the camera, the parts being beveled so that the latches are automatically thrust aside as the interchangeable lens is brought toward its seated position on the camera, and then snap behind the retaining shoulders on the lens. The latches are coupled to each other so that all move in unison. A radially movable button on the lens operates a lever to disengage all of the latches on the camera, so that the lens may be removed axially from the camera.

10 Claims, 7 Drawing Figures

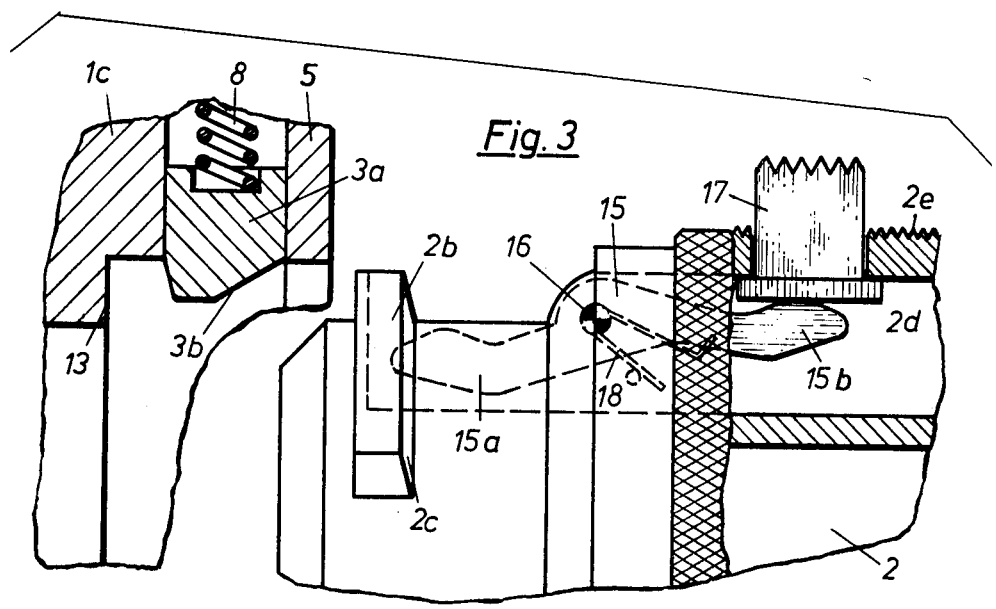
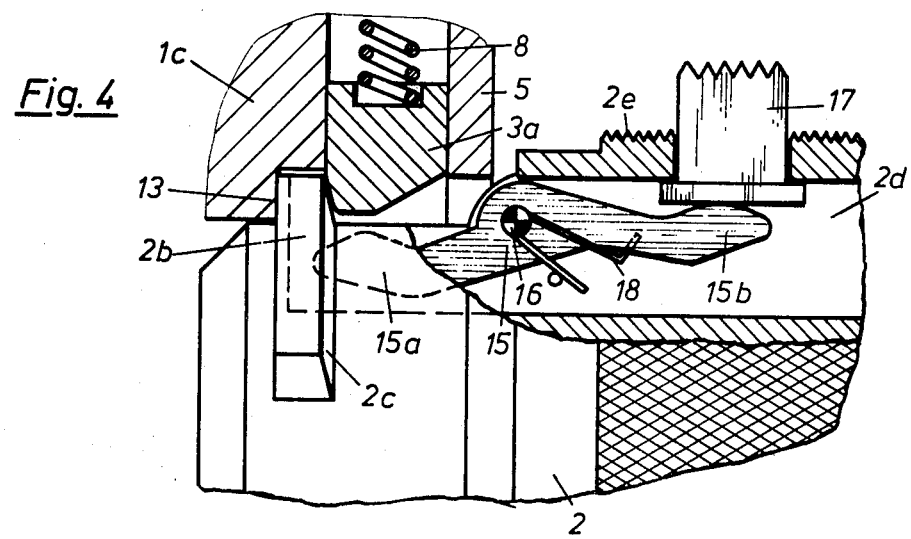
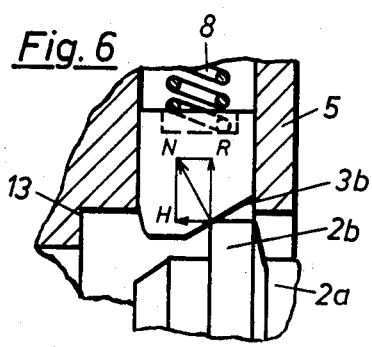
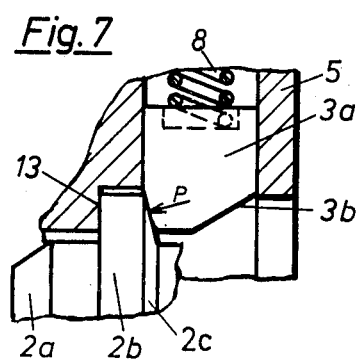

INTERCHANGEABLE LENS RETAINING MEANS FOR PHOTOGRAPHIC CAMERAS

BACKGROUND OF THE INVENTION

In modern photographic equipment, most interchangeable lenses are held in place by so-called bayonet connections, with a plurality of wings or lugs on the interchangeable lens engaging in slots on the camera, when the lens is first moved axially toward the camera and then twisted or rotated to a certain extent around the optical axis as a center. Many users find this rather cumbersome, in addition to which there is always the danger that, when a lens is applied to the camera, it will not be twisted or rotated sufficiently far to its intended completed mounted or home position.

It would be desirable, therefore, to provide a lens retaining arrangement whereby the interchangeable lens could be quickly and easily mounted on the camera by merely a straight axial motion, without any twisting or rotation. Such mounting mechanism has already been suggested, one example being disclosed in a German published application (Offenlegungsschrift) No. 2,159,152. However, the mechanism suggested in this German application is not wholly satisfactory, for various reasons.

An object of the present invention is the provision of a simple and satisfactory retaining mechanism enabling the mounting of the interchangeable lens on the camera by a simple axial movement alone, in the direction of the optical axis, without requiring any turning or twisting either of the lens or of any other part, and enabling the interchangeable lens to be simply and quickly removed from the camera likewise with a simple axial movement without any turning or twisting.

Another object is the provision of such mounting or retaining mechanism in a simple and comparatively inexpensive form, easy to manufacture, sturdy and reliable in use, and effective to hold the lens firmly in exactly the right position on the camera body, without any possibility of accidental disengagement.

Still another object is the provision of such mechanism where the latching contact between a part on the camera and a part on the lens is at least a linear contact and preferably an area contact, as distinguished from a mere point contact, thus distributing the holding pressure rather than concentrating it at one point, thereby enabling material of lower grade to be used for the contacting surfaces.

BRIEF DESCRIPTION OF THE DRAWINGS

FIG. 3 is a view partly in elevation and partly in section taken on a plane longitudinal with respect to the optical axis, illustrating a fragment of the camera and of the interchangeable lens in a slightly separated position being brought toward each other;

FIG. 4 is a view similar to FIG. 3 with the lens seated on and coupled to the camera;

FIG. 6 is a fragmentary view of the parts in an intermediate position between the position shown in FIG. 3 and the position shown in FIG. 4, illustrating particularly the force components acting on one of the latch members as the lens is being brought into engagement with the camera; and FIG. 7 is a view similar to FIG. 6 with the lens fully seated on the camera.

DESCRIPTION OF THE PREFERRED EMBODIMENTS

Figure 1:
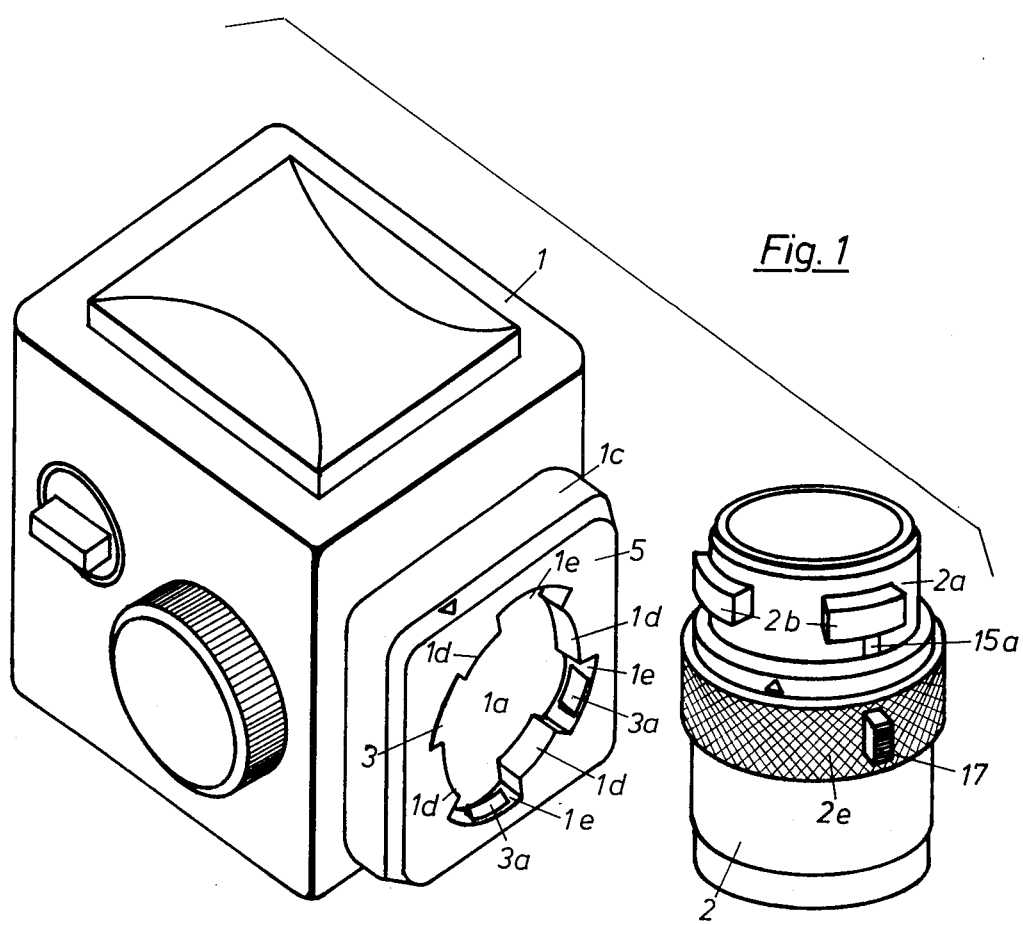
FIG. 1 is a perspective view of a camera and an associated interchangeable lens according to a preferred embodiment of the invention, in disengaged position relative to each other.

Referring now to FIG. 1, there are shown a camera indicated in general at 1 and an interchangeable lens indicated in general at 2. Except for the manner of attaching the interchangeable lens to the camera, both the camera and the lens may be of any desired conventional construction, the details of which are unimportant for purposes of the present invention. The camera is preferably but not necessarily of the type known as a single lens mirror reflex camera.

As already explained above, the present invention provides a construction in which the interchangeable lens may be mounted on or removed from the camera by a straight longitudinal motion in the direction of the optical axis, eliminating the twisting or turning of the lens relative to the camera body as required when using a conventional bayonet type of mount.

In the preferred construction, the interchangeable lens 2 is provided at its rear end with a cylindrical tubular extension 2a having a series of radially projecting lugs 2b spaced circumferentially around the tube 2a. The front faces of these projections or flanges 2b (that is, the faces toward the front of the lens) are beveled or oblique at a slight angle as indicated in FIGS. 3, 4, 6, and 7, while the rear faces of these flanges (that is, the surfaces facing the camera) are in a plane perpendicular to the optical axis.

Figure 2:
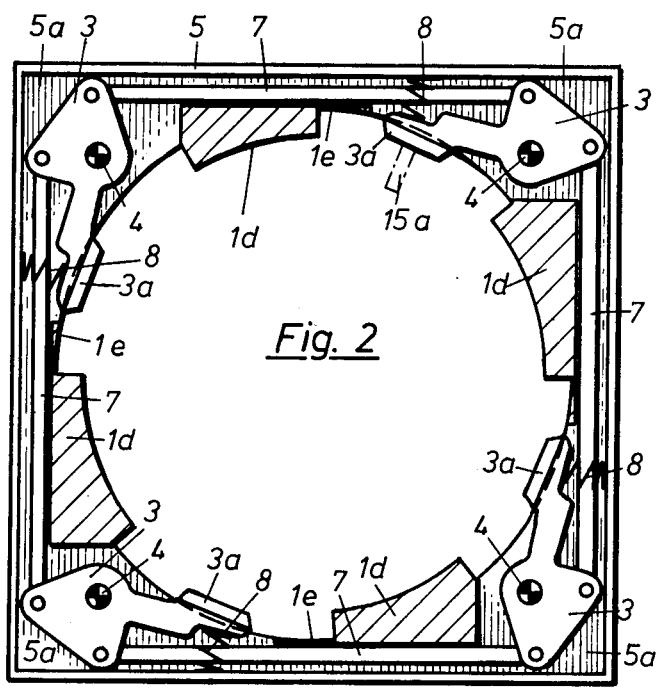
FIG. 2 is a view partly in elevation and partly in cross section on a plane perpendicular to the optical axis, illustrating details of the latching mechanism.

The front wall of the camera has an opening 1a (FIG. 1) for receiving the tube 2a and projections 2b of the interchangeable lens. This opening 1a may be formed in the front wall of the camera body but preferably is in a housing projection 1c on the front of the camera, this housing projection having a front plate or cover plate 5 in which the receiving opening 1 is formed. As illustrated in FIGS. 1 and 2, the housing projection 1c is preferably of approximately square shape. The opening 1a in the front plate 5 has a circumference shaped to receive snugly the tube 2a and projections 2b of the interchangeable lens. That is, the periphery of the opening 1a is formed with portions of smaller radius 1d which fit closely around the tube 2a, and portions 1e of larger radius for receiving the projections 2b on the lens tube. These portions 1e constitute, in effect, notches in the periphery of the opening 1a. One of the projections 2b on the lens is made either longer or shorter, in a circumferential direction, than the other projections, and its particular notch 1e is made of corresponding length, so that the rear end of the lens can be inserted in the opening 1a of the camera only in one particular position of orientation, this position being indicated by a reference mark on the camera and a corresponding reference mark on the lens mount, which should be aligned with each other before the lens mount is inserted into the camera.

Within the camera housing portion 1c there are latch members for engaging the projections or lugs 2b on the lens mount, to hold the lens mount firmly on the camera with the rear faces of the lugs 2b firmly mounted against a seating surface 13 formed on the housing portion 1c, as illustrated in FIGS. 4 and 7. These latching members may take various forms, but in any event they preferably are mounted to move with a motion which is either radial or at least has a component of radial motion with respect to the optical axis. When the housing portion 1c is approximately square, as illustrated, the latching members can be conveniently mounted in the corners, and so it is convenient to use four latching members, and the same number of lugs 2b on the interchangeable lens. Of course a greater or smaller number of lugs and cooperating latching members may be used if desired, but the use of four lugs and latching members has been found very satisfactory.

In the preferred form, each latching member is in the form of a lever 3 mounted on a fixed pin 4 and having a latching end or element 3a for engagement with the associated flange 2b of the lens. The pivot pins 4 are all parallel to each other and to the optical axis, so that the latching members 3 swing in a plane perpendicular to the optical axis.

The latching levers are preferably coupled to each other so that they all move in unison. In the form of coupling illustrated in FIG. 2, they are coupled to each other by connecting rods 7, each rod being pivoted at one end to one latch member and at the other end to another latch member. A coiled compression spring 8 is associated with each latch member to tend to turn it counterclockwise on its pivot, to cause the latching end 3a thereof to tend to move approximately radially inwardly toward the optical axis.

The front face of each latching element 3a is inclined or beveled at a sufficiently small angle to the optical axis so that as the lens is moved rearwardly into the camera, a reasonable amount of rearward pressure on the lens will be sufficient to displace the latch member radially outwardly against the force of its spring 8, to permit the lug or flange 2b to slip past the latching element. This is illustrated diagrammatically in FIG. 6, where it is seen that if the lens with the flange 2b is moved axially leftwardly, the corner of the flange engaging the oblique surface 3b on the latching element will exert force in a direction parallel to the optical axis, to the extent indicated by the vector arrow H. On account of the slope of the surface 3b, this axial force H will result in a force normal or perpendicular to the surface 3b as indicated by the vector arrow N, and there will be a resultant radial force indicated by the vector arrow R pushing the latch portion 3a radially outwardly against the force of its spring 8. All of the latching members will move outwardly simultaneously on account of the coupling rods 7, but of course also each one will be engaged by its own individual flange or lug 2b as the lens is moved rearwardly toward its seating position.

When the lens has been moved a little further rearwardly than the position illustrated in FIG. 6, the flange 2b moves past the inner edge of the latching element 3a, until the latching element snaps down against the front face of the flange 2b. The rear edge of the latching element 3a, is also beveled or chamfered, but at a much steeper angle relative to the optical axis than the front edge, so that the lens is effectively locked in place and a forward pull on the lens cannot exert sufficient radial force on the latching element to move it outwardly against the force of the spring 8. The amount of bevel or inclination on the rear face of the latching element is the same as that on the front face of the flange 2b, as illustrated in FIGS. 4 and 7, and when the lens is fully seated, each latch element produces a holding force in the direction of the arrow P (FIG. 7) on its individual flange 2b, firmly holding the flanges properly seated against the radially extending seating surface 13 of the camera.

Figure 5:
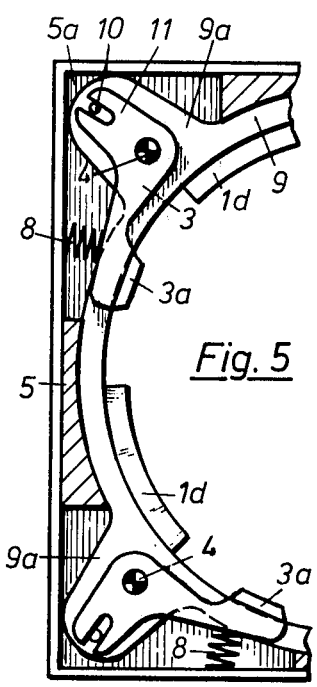
FIG. 5 is a view similar to FIG. 2 illustrating a modified form of the invention.

Instead of coupling the latches to each other by the rods 7 as in FIG. 2, they may be coupled by a ring 9 as in FIG. 5. This coupling ring 9 rotates about the optical axis as a center, and has a pin and slot connection 10, 11 with an outwardly extending arm on each latch member 3.

To release the latch members to enable the lens to be removed from the camera when desired, the lens mount is provided with a two-armed lever 15 (FIGS. 3 and 4) pivoted on an approximately tangentially extending pin 16 in the lens mount, so that the lever swings in a plane containing the optical axis. The rear end 15a of this lever swings in a radially and axially extending slot in the lens mount, and the front end 15b underlies a push button 17 which extends radially through the wall of the lens mount near the rear end thereof as illustrated in FIGS. 1, 3, and 4. A spring 18 tends to turn the lever 15 counterclockwise when viewed as in FIGS. 3 and 4.

When the lens is mounted in the camera, the rear end 15a of the lever lies beneath one of the latching elements 3a, as illustrated in broken lines in FIG. 2. When the lens is to be removed from the camera, the user pushes radially inwardly on the push button 17, swinging the lever 15 so that the rear end 15a moves radially upwardly away from the optical axis, engaging the particular latching element 3a which overlies it, and moving this latching element radially outwardly away from its engagement with the flange 2b on the lens mount. Because of the coupling 7 or 9, all of the other latching elements simultaneously move radially outwardly from in front of their respective lens flanges 2b, so that the lens is released and can be removed from the camera by a straight forward pull in an axial direction. Preferably the release button 17 is located in a knurled grasping ring which encircles the lens, as illustrated in FIG. 1, so that the same hand which grasps this ring in order to hold the lens safely can also depress the button 17 at the same time.

It is noted that the latching contact between each latching member 3a and its associated flange 2b is a contact over a substantial area, or at least a line contact as distinguished from a point contact. Thus the latching pressure (in the direction of the arrow P in FIG. 7) is distributed over an area and not concentrated at a single small point, as would be the case if latching pressure were produced by engagement of a round ball or the like. Thus a high intensity of pressure per unit of area is not produced, and therefore the parts 2b and 3a can be made of material of moderate quality and it is not necessary to use the very hard and high quality and expensive material that would be needed if the latching pressure were exerted in concentrated points rather than in a line or area contact.

What is claimed is:

1. Retaining means for detachably coupling a lens to a camera upon axial movement without rotary movement of the lens relative to the camera, said retaining means comprising radially extending flange means on said lens, said flange means having a front face and a rear face, latch means mounted on said camera for movement having a radial component between a latching position engaging said front face when said lens is seated on said camera to hold said lens against removal therefrom and an unlatching position disengaged from said front face, spring means tending to move said latching means toward its latching position, and latch releasing means mounted on said lens for shifting said latch means from its latching position to its unlatching position to permit removal of said lens from said camera.

2. Retaining means as defined in claim 1, wherein said camera has an opening for receiving a portion of said lens, said opening and said portion having mating peripheral contours so shaped that said portion of said lens can be inserted in said opening only in one certain position of rotary orientation of said lens relative to said camera.

3. Retaining means as defined in claim 1, wherein said latch means comprises a plurality of latching levers swingable on respective pivotal axes which are parallel to each other and to the optical axis of the camera, and means for coupling all of the latching lever to each other for concurrent movement between their respective latching positions and unlatching positions.

4. Retaining means as defined in claim 3, wherein said coupling means comprises connecting rods pivotally connecting the respective latching levers to each other.

5. Retaining means as defined in claim 3, wherein said coupling means comprises a ring mounted for rotation concentric with the optical axis and operatively connected to each of said latching levers.

6. Retaining means as defined in claim 1, wherein said latch means has a front face inclined at an angle to the optical axis and so formed that as said lens is moved axially toward said camera said flange means on said lens will engage said inclined front face of said latch means and move said latch means to its unlatching position to allow said flange means to pass to a position rearwardly of said latch means.

7. Retaining means as defined in claim 1, wherein said latch means comprises a plurality of pivoted levers each having a first end for engaging said flange means and a second end coupled to the respective second ends of the other levers, and wherein said spring means comprises a spring acting on said first end of each of said pivoted levers.

8. Retaining means as defined in claim 1, wherein said camera includes an adapter housing of approximately square outline enclosing said latch means, and wherein said latch means comprises a plurality of latching levers mounted approximately in the corners of said adapter housing.

9. Retaining means as defined in claim 1, wherein said latch means comprises a plurality of latching levers coupled to each other for concurrent movement between respective latching positions and unlatching positions, and wherein said latch releasing means comprises a manually operable device on said lens for engaging one of said latching levers to move it to its unlatching position and thereby moving all of the other latching levers to their unlatching positions on account of the coupling of the levers to each other.

10. Retaining means as defined in claim 9, wherein said manually operable device comprises a double armed lever pivotally mounted on said lens, and a manually operable push button mounted on said lens for engaging a first arm of said lever to move it, the second arm of said lever being positioned to underlie one of said latching levers and to shift such latching lever to its unlatching position when said push button is operated to move the first arm of said double armed lever.

* * * * *